United States Patent
Hecht

Patent Number: 5,430,372
Date of Patent: Jul. 4, 1995

[54] ROTARY ANGLE MEASURING DEVICE WITH SENSOR COILS SURROUNDING ROTOR HAVING AXIALLY OFFSET REGIONS

[75] Inventor: Hans Hecht, Korntal, Germany

[73] Assignee: Robert Bosch GmbH, Stuttgart, Germany

[21] Appl. No.: 129,431

[22] Filed: Sep. 30, 1993

[30] Foreign Application Priority Data

Dec. 18, 1992 [DE] Germany .................. 42 43 022.4

[51] Int. Cl.⁶ .............................................. G01B 7/14
[52] U.S. Cl. ................... 324/207.16; 324/207.22; 324/207.25
[58] Field of Search ............... 324/207.22, 207.16, 324/207.25, 173, 174, 207.13

[56] References Cited

U.S. PATENT DOCUMENTS 4,743,786  5/1988  Ichikawa et al. .............. 324/207.25

FOREIGN PATENT DOCUMENTS 4122478  8/1992  Germany .

Primary Examiner—Walter E. Snow
Attorney, Agent, or Firm—Michael J. Striker

[57] ABSTRACT

A measuring device for contactless determination of a rotary angle of a shaft has a movable body composed of at least one of an electrically conductive material and a ferro-magnetic material, and sensor coils relative to which the body moves and whose inductivity and alternating current resistance values are varied as a result of a relative change of a size of regions of the body which are associated with the coils. The regions of the body are provided in a number corresponding to a number of the coils and are offset relative to one another in an axial direction. Each of the coils extends over the regions of the body on opposite sides, so that each coil during a rotation of the body by 360° is brought in operative connection with a whole associated surface of the regions.

3 Claims, 1 Drawing Sheet

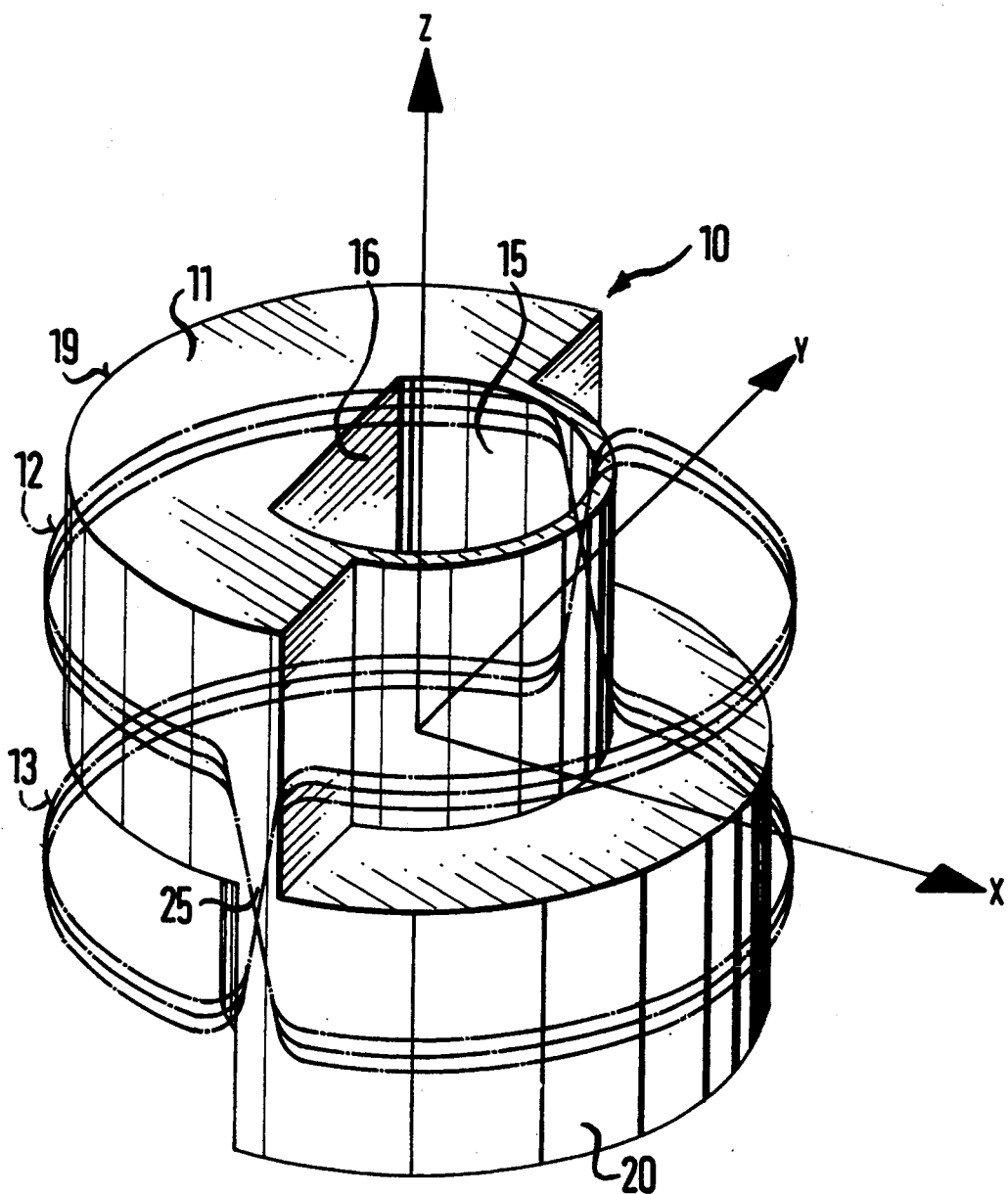

ROTARY ANGLE MEASURING DEVICE WITH SENSOR COILS SURROUNDING ROTOR HAVING AXIALLY OFFSET REGIONS

BACKGROUND OF THE INVENTION

The present invention relates to a measuring device for determining a rotary angle.

More particularly, it relates to such a measuring device which includes two bodies movable relative to one another and sensor coils whose inductivity or alternating current resistance values vary due to the relative change of the associated regions of the coils.

Measuring devices of the above-mentioned general type are known in the art. One of such measuring devices is disclosed for example in the German patent document DE-OS 41 22 478.7. In this measuring device a rotor moves in one coil body. The rotor is composed of two regions which are offset relative to one another in an axial direction, so that the regions during the rotary movement change the distance relative to their associated coils in dependence on the rotary angle. For producing the measuring signal, it is, however, necessary to cover the coils in a partial region by a shielding plate. In this measuring device, no measurement error can occur due to parallel displacements in the axial direction, or in other words, in the so-called z-direction. However, eventually occurring vibrations between the rotor and the outer surface of the measuring coils, or in other words, in the remaining direction, can result in measurement errors.

SUMMARY OF THE INVENTION

Accordingly, it is an object of the present invention to provide a measuring device for determining a rotary angle, which avoids the disadvantages of the prior art.

In keeping with these objects and with others which will become apparent hereinafter, one feature of the present invention resides, briefly stated, in a measuring device for contactless determination of a rotary angle, in which each coil extends over the individual regions of the body at corresponding opposite sides, so that each coil during a rotation of the body by 360° is brought in operative connection with the whole associated surface of these regions.

When the measuring device is designed in accordance with the present invention, it has the advantage that the measurement signal is free from errors due to fluctuations of the distance between the rotor and the outer surface of the coils in all three directions.

The compensation in the corresponding coil is performed automatically, so that no additional expensive evaluating circuit is needed. Due to the long structure of the axes of the rotor no canting in the direction of the x-axis and y-axis because of a tilting, can occur. Since the rotor no longer has to have its own support, a substantial cost advantage is also obtained. Two approximately exact linear measuring regions are provided, which make possible a region of over 120° correspondingly. This angular region is specially required for the determination of the throttle flap angle during gasoline injections. The measuring signal is therefore independent both from temperature and from an offset in each axial direction.

In accordance with another feature of the present invention, each coil is offset in the axial direction of the measuring device, so that a step-shaped offset as considered in an axial direction is obtained between a first region of the coil and a second region of the coil.

In accordance with another feature of the present invention, in a base position the zones of a first coil are associated with the first regions of the body with a smaller distance than the zones of a second coil are associated with the other regions of the body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single Figure of the drawings is a view schematically showing a device for determination of a rotary angle in accordance with the present invention.

DESCRIPTION OF A PREFERRED EMBODIMENT

The device for determining a rotary angle has a sensor which is identified as a whole with reference numeral 10. The sensor includes a rotor 11 and two coils 12 and 13. The coils 12 and 13 are wound on coil bodies which are not shown in the drawings for the sake of simplicity of illustration. The coil body has a sleeve-shaped construction and is composed of an electrically non-conductive material. The rotor 11 has an axial direction which is the z-direction shown in the drawing. An opening 15 extends in the axial direction. A shaft whose rotary movement must be determined extends through the opening 15. The shaft is also not shown in the drawing for the sake of simplicity of illustration. For obtaining a rotary-fixed rotation between the shaft and the rotor 11, the opening 15 is provided at its side with a flattening 16. The shaft, however, can be connected also with a not-shown structural part, so that the rotary movement of the structural part is determined.

The rotor 11 has cores 19 and 20 which are offset relative to one another in an axial direction. They have a cross-section which is approximately semi-circular in shape or approximately D-shaped. However, other shapes of the cores are possible as well. What is important, however, is that the cores of the rotor 11 are connected with one another in an electrically conductive manner. With the opening 15 and the shaft arranged in it, the cores 19 and 20 correspondingly surround the shaft or the opening 15. The cores 19 and 20 are offset relative to one another in a radial direction by 180°, so that with the D-shape construction of the cores 19 and 20, the somewhat bent wall embraces the axis of the rotor 11. Thereby the circularly bent outer faces of both cores 19 and 20 face toward the corresponding opposite side. The rotor 11 is composed of an electrically conductive (ferro-magnetic and/or non-ferro-magnetic) material or of ferro-magnetic material. The rotor 11 can be formed as a solid body composed of the above-mentioned materials. It is also possible that only its outer layer, for example the surface which faces the coils, can be composed of these materials. For example, the circular outer surface of the rotor can be provided with such a coating.

Two coils 12 and 13 are arranged on the inner side of a not-shown coil body which has a substantially sleeve-shaped figure and embraces the rotor 11 in its axial direction. The coils 12 and 13 are arranged so that they are in operative connection with both cores 19 and 20.

It is to be understood that also several coils can be utilized which in this case are connected with one another in a series connection. The coils 12 and 13 embrace correspondingly one of the cores 19 and 20 over approximately 180° and another core at the opposite side also at approximately 180°. Since both cores 19 and 20 surround the opening 15, an overlapping region 25 of both cores as considered in a radial direction is produced. For the operation, the overlapping region is not necessarily required. However, a gap between the cores must be avoided. In the overlapping region 25, the coil 12 extends from one core 19 to another core 20 or, at the other diametrically opposite overlapping region, again from one core 20 to another core 19. Thereby a somewhat stepped wound coil is produced. For the other coil, a winding is performed in the same above-mentioned direction. In the position shown in the drawings, the coil 13 faces the rear side of the core and extends similarly in the overlapping region 25 from one core 19,20 to another core 19,20. It is to be understood that both coils 12 and 13 must not be directly electrically connected in the overlapping region 25.

In an initial position, which is shown for example in the drawing, one coil 12 faces correspondingly the circular outer surface of the cores 19,20 and another coil 13 faces correspondingly the rear side of the cores 19,20. Therefore, the distance from the outer surface of the winding of the coil 12 to the outer surface of the rotor 11, is smaller than the distance from the outer surface of the rotor 11 to the outer surface of the coil 13. In this initial position shown in the drawing, both the core 19 and the core 20 have correspondingly the same distances to the associated coils 12,13. It is to be understood that also another arrangement of the rotor 11 with respect to both coils 12,13 can be selected as an initial position. For example, an arrangement over the rotor 11 with respect to the coils 12,13, which is turned by 90° relative to the position shown in the drawing, can be selected as an initial position. This position has the advantage that a change of the direction of the rotation can be determined.

The sensor 10 can operate in accordance with the inductive and/or eddy current principle. In all cases, an alternating current flows through the coils 12,13. For measurements, the rotor 11 is turned around its axis or moved by a desired angular region. In the following description, the eddy current principle is illustrated. A magnetic alternating field is produced on the coils 12,13 and causes an eddy current on the metallic surface of the rotor 11. The greater the surface of the rotor 11 through which the magnetic field passes, the more eddy currents are produced. Furthermore, the value of the produced eddy currents is dependent on the utilized material of the rotor 11 and also, as is decisive in accordance with the invention for measurement signal generation, it depends on the distance of the coils 12,13 to the associated surface of the rotor 11. Due to the eddy current produced on the surface of the rotor 11, the coil alternating resistance is changed, which is used for producing the measuring signal. Since the coil inductivity reduces with increasing eddy current formation, these inductivity changes can be utilized for producing the measuring signal (coil inductivity evaluating process). During the rotary movement of the rotor 11, the eddy current formation associated with the corresponding coil 12,13 is changed, and thereby the coil alternating resistance is changed proportionally to the rotary angle. This change is connected with the fact that the coil correspondingly in a region of the core is arranged with a greater or a smaller distance from the coil. When the coil 12 is considered and the rotary movement of the rotor is performed in a clockwise direction, then in the initial position shown in the drawing, correspondingly the circularly shaped surface is associated both with the core 19 and the core 20 of the coil 12. During the rotary movement of the rotor 11, the surface of the rotor 11 moves a small distance to the coil 12 from the region of the coil 12 outwardly, and the circular surface of the opposite region of the core 19 is moved by the same amount in the region of the coil 12. Thereby the value of the coil alternating current resistance change produced in this coil portion 12 changes in dependence on the rotary angle, since as stated above, the distance from the surface of the core 19 to the region of the coil 12 facing the core 19 is increased. The coil resistance value changes with the same effect by the core 20 in another region of the coil 12. The alternating current resistance value also changes in the coil 13 analogously to the above but in the opposite direction, since the distance between the surface of the corresponding core of the rotor 11 and the associated region of the coil 13 is increased. An evaluating device can associate an angular rotation of the shaft in correspondence with the alternating current resistance changes.

The measuring signal can be further influenced when instead of a circular surface of the core of the rotor, for example, an elliptical cross-section is utilized. This means that the distance is not exactly constant.

In stead of the above-described eddy current principle, also the inductive measuring principle can be used. For this purpose, the rotor 11 must be composed of a ferro-magnetic material. The rotor 11 can be formed naturally as a solid body of a ferro-magnetic material, or can be provided with a ferro-magnetic outer layer.

Due to the special arrangement of the coils 12,13 relative to the rotor 11, the displacements in the x-direction and y-direction in the corresponding coils 12,13 are compensated. When a displacement of the rotor 11 relative to the stationary coil 12 is considered, it can be seen that the distance between the surface of the core 20 relative to the region of the associated coil 12, is reduced by the amount by which the distance between the core 19 and the associated region of the coil 12 is increased. Since the corresponding changes are equal as to their amount, therefore the changes of the alternating current resistance of the coil in the corresponding coil are automatically compensated. These effects occur when a displacement of the rotor 11 in the y-direction relative to the coil 12 is considered. Here also the distance is increased by the amount by which it is reduced at the other side. For the other coil 13, the analogous measuring effect takes place both in the x-direction and in the y-direction. For preventing a measuring error because of the displacement in the z-direction between the rotor 11 and the coils 12,13, the width of the corresponding coil 12 or 13 is smaller than the width of the core 19 or 20. Inductivity changes due to the displacements of the rotor 19 in the z-direction are identical for both coils 12,13. They are compensated in an evaluating circuit which as a rule evaluates the difference of both coil signals. Further, it has to be mentioned that during the use of the measuring direction for determination of the throttle flap position in motor vehicles, due to the long bearing extension of the shaft, a tilting of the rotor 11 relative to the coils 12,13 is prevented.

The rotor 11 can be rotated in the coils 12,13 by 360°. Thereby, twice an approximately linear measuring region of approximately 120° is obtained. The remaining non-linear regions are for example dependent on the stepped construction of the coil, or in other words, on the transition of the coil from one core to the other core.

It will be understood that each of the elements described above, or two or more together, may also find a useful application in other types of constructions differing from the types described above.

While the invention has been illustrated and described as embodied in a measuring device for determination of a rotary angle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A measuring device for contactless determination of a rotary angle of a shaft, comprising two bodies which are movable relative to one another and are composed of at least one of an electrically conductive material and a ferro-magnetic material, one of said bodies being formed as a rotor having two regions which are offset relative to one another in an axial direction; sensor coils whose inductivity and alternating current resistance values are varied as a result of a relative change of a size of said regions associated with said coils, said regions of said rotor being provided in a number corresponding to a number of said coils, each of said coils extending over both said regions of said rotor on opposite sides of said regions, so that each coil during a rotation of said rotor by 360° is brought in operative connection with a whole associated surface of said regions.

2. A measuring device for contactless determination of a rotary angle of a shaft, comprising two bodies which are movable relative to one another and are composed of at least one of an electrically conductive material and a ferro-magnetic material; sensor coils whose inductivity and alternating current resistance values are varied as a result of a relative change of a size of regions of said bodies, which regions are associated with said coils, said regions of a first one of said bodies being provided in a number corresponding to a number of said coils, and said regions being offset relative to one another in an axial direction, each of said coils extending over said regions of said first body on opposite sides, so that each coil during a rotation of said first body by 360° is brought in operative connection with a whole associated surface of said regions, each of said coils being offset in an axial direction so that a step-shaped offset in the axial direction is produced between a first region of each of said coils and a second region of each of said coils.

3. A measuring device for contactless determination of a rotary angle of a shaft, comprising two bodies which are movable relative to one another and are composed of at least one of an electrically conductive material and a ferro-magnetic material; sensor coils whose inductivity and alternating current resistance values are varied as a result of a relative change of a size of regions of said bodies, which regions are associated with said coils, said regions of a first one of said bodies being provided in a number corresponding to a number of said coils, and said regions being offset relative to one another in an axial direction, each of said coils extending over said regions of said first body on opposite sides, so that each coil during a rotation of said first body 360° is brought in operative connection with a whole associated surface of said regions, in a base position of said coils having zones which are associated with a first region of said rotor with a small distance, while another of said coils has zones which are associated with another of said regions of said rotor with a greater distance.

* * * * *